(12) United States Patent
Scheideler et al.

(10) Patent No.: US 10,678,857 B2
(45) Date of Patent: Jun. 9, 2020

(54) MANAGING A DISTRIBUTED KNOWLEDGE GRAPH

(71) Applicant: International Business Machines Corporation, Armonk, NY (US)

(72) Inventors: Tim U. Scheideler, Schoenenberg (CH); Erik Rueger, Ockenheim (DE); Frederik F. Flöther, Schlieren (CH); Stefan Ravizza, Wallisellen (CH)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 15/933,748

(22) Filed: Mar. 23, 2018

(65) Prior Publication Data

US 2019/0294733 A1    Sep. 26, 2019

(51) Int. Cl.
*G06F 16/90* (2019.01)
*G06F 16/901* (2019.01)

(52) U.S. Cl.
CPC ................ *G06F 16/9024* (2019.01)

(58) Field of Classification Search
CPC ................................................. G06F 16/9024
USPC ................ 707/798, 612, 822, E17.032
See application file for complete search history.

(56) References Cited

U.S. PATENT DOCUMENTS

| 9,632,654 B1* | 4/2017 | Elassaad | G06F 16/951 |
| 2004/0186916 A1 | 9/2004 | Bjorner | |
| 2009/0077002 A1* | 3/2009 | Clark | G06Q 10/107 |
| | | | 706/59 |
| 2010/0318537 A1 | 12/2010 | Surendran | |
| 2012/0054472 A1 | 3/2012 | Altman | |
| 2012/0101980 A1* | 4/2012 | Taleghani | G06F 17/2288 |
| | | | 707/608 |
| 2014/0337306 A1* | 11/2014 | Gramatica | G06F 17/2785 |
| | | | 707/706 |

(Continued)

FOREIGN PATENT DOCUMENTS

DE    202016008225 U1    6/2017

OTHER PUBLICATIONS

"Centrality", From Wikipedia, the free encyclopedia, this page was last edited on Feb. 11, 2018, 13 pages, <https://en.wikipedia.org/wiki/Centrality>.

(Continued)

*Primary Examiner* — Baoquoc N To
(74) *Attorney, Agent, or Firm* — Robert J. Shatto

(57) ABSTRACT

A knowledge graph is divided into a plurality of sub-graphs, each sub-graph comprising a plurality of vertices and a plurality of edges. The knowledge graph is represented as a summary graph comprising for each of the sub-graphs a summary-graph vertex. A local sub-graph is generated as a copy of one of the sub-graphs together with a copy of a surrounding graph to the one of the sub-graphs. The content of the local sub-graph is modified. The local sub-graph is reintegrated, upon a reintegration trigger event, back into the knowledge graph, wherein a structure of the surrounding graph is used as a reintegration aid, by overlaying the structure and the knowledge graph, thereby identifying identical vertices of the surrounding structure and the knowledge graph as anchor points from where changes in the local sub-graph are reintegrated into the knowledge graph.

17 Claims, 7 Drawing Sheets

(56) References Cited

U.S. PATENT DOCUMENTS

2015/0169758 A1\* 6/2015 Assom .................. G06F 16/36
707/603
2015/0302088 A1\* 10/2015 Wu ........................ G06N 5/04
706/11
2016/0314158 A1 10/2016 Kelly

OTHER PUBLICATIONS

"Community structure", From Wikipedia, the free encyclopedia, this page was last edited on Feb. 13, 2018, 9 pages, <https://en.wikipedia.org/wiki/Community_structure>.

Koutra, et al., "VOG: Summarizing and Understanding Large Graphs", SIAM International Conference on Data Mining (SDM) 2014, 10 pages, <https://arxiv.org/abs/1406.3411>.

Liu, et al., "Reducing Million-Node Graphs to a Few Structural Patterns: A Unified Approach", Published 2016, Semantic Scholar, 8 pages, <https://www.semanticscholar.org/paper/Reducing-Million-Node-Graphs-to-a-Few-Structural-P-Liu-Safavi/6e8d49ff7e0533fb33edb166d261d1124adba8f4>.

\* cited by examiner

MANAGING A DISTRIBUTED KNOWLEDGE GRAPH

BACKGROUND

The present disclosure relates generally to a method for managing a knowledge graph, and more specifically, to managing a knowledge graph as a plurality of sub-graphs. The present disclosure relates further to a related system for managing a knowledge graph and a related computer program product for managing a knowledge graph.

The management of data, especially unstructured data, continues to be a struggle for enterprises. It continues to be difficult to store and manage expert skilled knowledge in a way allowing quick and reliable access, particularly in remote locations. Lately, knowledge graphs, using cognitive computing techniques, have been introduced to store and process information and dependencies between portions of information. A knowledge graph consists of facts, which may be collected from various sources inside and outside the enterprises, and the facts may be stored on the vertices of a mesh of vertices of the knowledge graph. The vertices are typically connected via edges (also known as links) representing the relationship between individual vertices.

SUMMARY

Disclosed herein are embodiments of a method, system, and computer program product for managing a knowledge graph. The knowledge graph is divided into a plurality of sub-graphs, each sub-graph comprising a plurality of vertices and a plurality of edges. The knowledge graph is represented as a summary graph comprising for each of the sub-graphs a summary-graph vertex, wherein each summary graph vertex is related to a respective index file and a respective content file, wherein the respective index file comprises a list of the vertices of the sub-graph and edges of the sub-graph, and wherein the respective content file comprises searchable content of the sub-graph. A local sub-graph is generated as a copy of one of the sub-graphs together with a copy of a surrounding graph to the one of the sub-graphs, wherein the surrounding graph comprises a group of vertices of the knowledge graph that are each linked to the plurality of vertices of the one of the sub-graphs via less than a threshold number of edges. The content of the local sub-graph is modified. The local sub-graph is reintegrated, upon a reintegration trigger event, back into the knowledge graph, wherein a structure of the surrounding graph is used as a reintegration aid, by overlaying the structure and the knowledge graph, thereby identifying identical vertices of the surrounding structure and the knowledge graph as anchor points from where changes in the local sub-graph are reintegrated into the knowledge graph.

The above summary is not intended to describe each illustrated embodiment or every implementation of the present disclosure.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
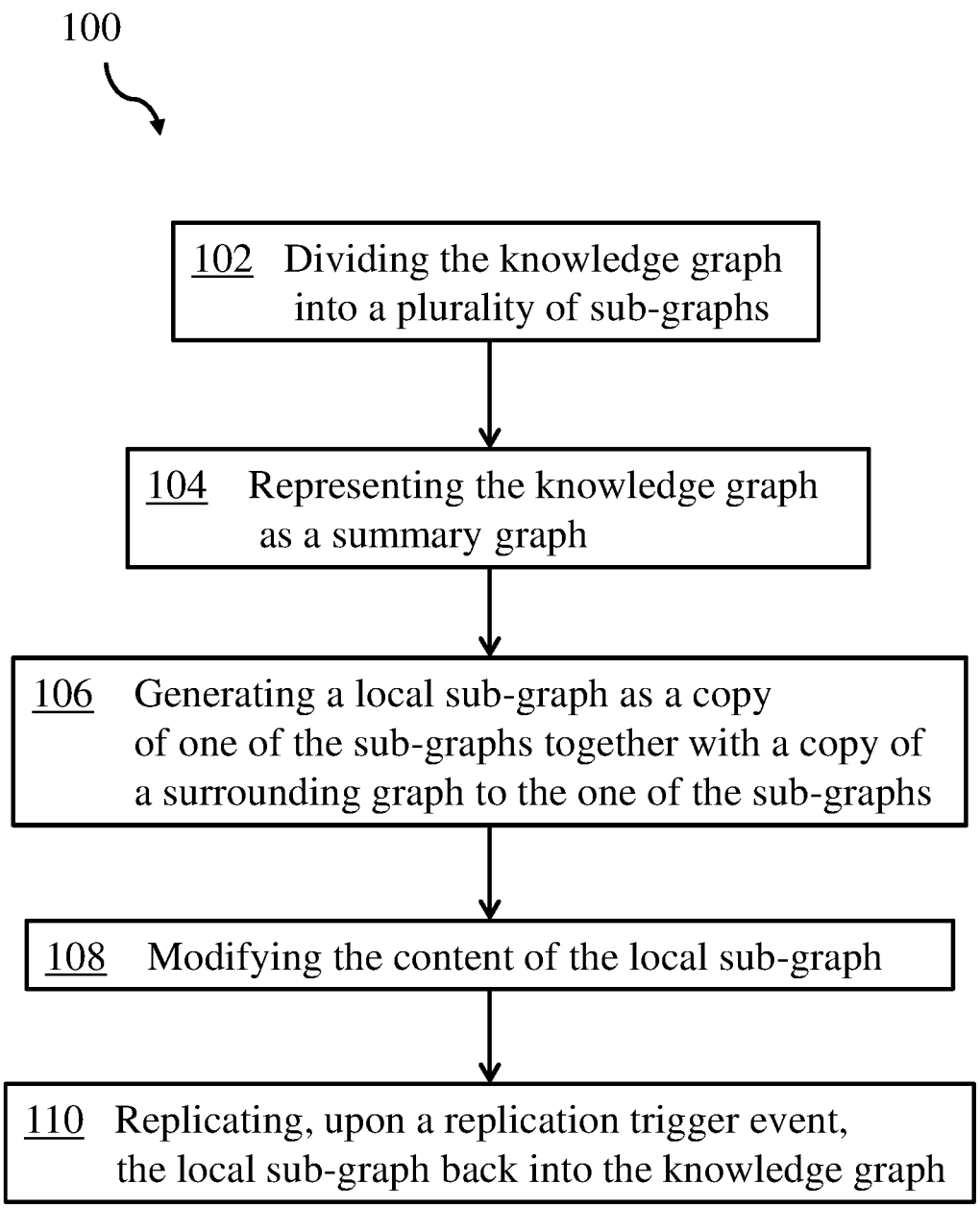
FIG. 1 shows a flow chart of an example method for managing a knowledge graph.

In the context of this description, the following conventions, terms, and/or expressions may be used:

The term "knowledge graph" may denote a networked data structure comprising facts represented in vertices and edges representing connections or links between the vertices. Thus, the knowledge graph may represent a knowledge base for an organization of so-called unstructured data, i.e., facts, and their semantic relationships. Knowledge graphs are often used by search engines. Different types of knowledge graphs may be differentiated throughout this document. The initial, or main, or original knowledge graph may denote the global un-spilt knowledge graph comprising all vertices and all edges in its original form. One or more sub-graphs may be generated out of the main knowledge graph. They may define copies of sub-areas of the main knowledge graph at the time of their generation. The detached copies of the sub-graphs may be modified in terms of changes to the vertices and edges over the course of time.

The term "vertex," which can also be referred to as "node," may denote a data structure in the context of the knowledge graph storing content facts and/or attributes and may comprise a dedicated sub-structure. Vertices may be identifiable by related vertex identifiers.

The term "edge" may denote a relationship between two vertices of a knowledge graph. A data structure "edge" may comprise identifiers for at least two vertices, the edge is linking or bringing into relationship. An edge may also comprise a weighing factor, or simply a weight, allowing definition of a strength of the relationship between the connected vertices.

The term "summary graph" may denote a data structure according to the rules and conventions of knowledge graphs in general. However, a large central knowledge graph may be partitioned into sub-graphs of the original knowledge graph, wherein each sub-graph may represent one of the partitions or portions of the original, initial knowledge graph and each of the sub-graphs may be represented by one single summary so that a summary graph may be generated out of the summary vertices.

The term "index file" may denote a data structure relating to a vertex of the summary graph. The index file may comprise a list of vertices in a related sub-graph. Thus, all vertices in the sub-graph may be identifiable easily. Also, a compressed content of the sub-graph may be related to the index file.

The term "content file" may denote a file comprising searchable information of the vertices of the sub-graph. This may be an aggregation of the content of all vertices of the sub-graph and/or it may be a subset or a superset of the content of the related vertices. The content file may optionally also comprise a condensed content of the sum of the vertices of the sub-graph, e.g., by using semantic techniques.

The term "surrounding structure" may denote a group of vertices surrounding a sub-graph, wherein each of the vertices of the surrounding structure may be linked via edges to vertices in the sub-graphs by less than three edges. This may ensure that the sub-graphs may address a topic in a relatively complete form, as complete as possible within the original, main knowledge graph. In some embodiments, a number other than three may be substituted such that a "surrounding structure" could, for example, allow vertices linked via edges to vertices in the sub-graphs by less than four edges instead.

The term "group of vertices" may denote a plurality of individual vertices of the main knowledge graph having less than 3 links to vertices of the sub-graph. This group of vertices may define the surrounding structure to the sub-graph. In some embodiments, a number other than three may be substituted, as above.

The term "linked" may denote that a connection between one vertex and another vertex may exist. This connection may be represented by an edge. Each edge may have a related weight factor value.

The term "change" may denote any modification performed to a mesh of vertices linked by edges. These changes may relate to the content of the individual vertices, as well as updating relationships between the vertices—in particular, changing a weight of an edge or adding or deleting the edge completely. Additionally, a parameter used for describing a sub-graph of the main knowledge graph may be subject of a modification. A change or modification may also relate to one or more vertex or vertices of the mesh, e.g., the sub-graph, by changing its content or other parameters.

The term "locking" may denote that a certain area in the knowledge graph (in particular, a sub-graph of the main, original knowledge graph) may be blocked from changes as long as the locking may exist. This concept may be comparable to a locking of a database record. A locked database record (as known by a person skilled in the art) may not be changed, as long as the record is blocked. The locking of a sub-graph may denote that no changes to the vertices and the edges within a knowledge graph may be allowed.

Knowledge graphs may consist of many vertices, including tens of thousands, hundreds of thousands, or even millions of vertices, between which selected relationships exist. Not all users may have access to the complete knowledge graph. A management concept may be used to allow certain users or user groups only access to certain topics represented by sub-graphs of the complete knowledge graph. These users may also want to access the content of the knowledge graph using a mobile device having limited or, in some cases, no network connection. Additionally, such devices may have limited processing and of memory capacity so that a complete copy of the initial knowledge graph to the mobile device may not be feasible. On the other side, mobile users may have been invited to make modifications to such a sub-graph of the original knowledge graph. Such a situation may represent conflicting objectives given to the limitations in bandwidth, processing power, and memory. An objective of the present disclosure may be in solving such conflict.

Embodiments of the method (or system or computer program product) for managing a knowledge graph may offer multiple advantages and technical effects. Embodiments of the present disclosure may allow a usage of one or more sub-group of vertices of a comparably large knowledge graph also on the remote devices having limited processing power and limited memory. It may also not be required to have a permanent network connection between a server supporting a central knowledge graph and the remote, partial knowledge graph. Moreover, it may be possible to edit the remote portion of the knowledge graph and reintegrate it afterwards into the central knowledge graph without any manual intervention. This may be possible by a reintegration matching technology that takes the surrounding of the portion (i.e., the sub-graph) of the knowledge graph into account which may have been transferred to a remote device.

The option to change the remote sub-graph may include to change/add/delete vertices or related parameters, as well as, change/add/delete edges between the vertices of the sub-graph. Thus, the full spectrum of management functions that is typically available for a knowledge graph may also be available for users having only access to the sub-graph.

However, in some embodiments a central knowledge graph may be managed in one partition of a large physical server. Such a server may allow a partitioning of the operating system resource and/or user space. With this, a prerequisite may be given under which a large knowledge graph may be split up a portion of a knowledge graph as a copy—while still keeping its content as part of the large knowledge graph—and transfer the sub-graph copy to another partition on the server. Such a partition may be accessed by users with limited access rights to the large original knowledge graph. E.g., users working remotely from the server may only access the sub-graph in the special partition, without being exposed to the central, original, complete knowledge graph. This technique may also be used for users having only paid for accessing a sub-graph of the knowledge graph.

Thus, the embodiments described herein enable working with and on a portion of the knowledge graph (i.e., the sub-graph) with the option to manipulate the sub-graph on a device (e.g., mobile phone, tablet computer, etc.) having only limited processing power, main memory, and/or bandwidth capacities and, at the same time, upload the changed sub-graph back to the central server operating the initial, complete knowledge graph. On the other side, the sub-graph may be separated from the initial, large knowledge graph by moving it to another partition on the same server (or a different virtual or physical server) and allowing a restricted access to only a portion (i.e., the sub-graph) of the knowledge graph.

This may increase the flexibility in enhancing knowledge graphs significantly. For example, different parts of the central knowledge graph may be identified and may be moved into a controlled area (e.g., remote devices, different partitions) and accessible by different users. These users may then modify the sub-graphs without influencing each other. This way, the speed of adoption of the knowledge graph to new requirements may be increased significantly if compared to a standardized approach to knowledge graph adoption.

In the following, additional embodiments of the method, system, and computer product for managing a partially distributed knowledge graph will be given.

In some embodiments, the method may also comprise separating the summary graph which may also comprise transferring the summary graph to a remote device (or another partition). This way, the main knowledge graph may be searchable—even if in a summarized form—on a remote device (of no network connection) and may be available between the remote device and the server storing the central, main knowledge graph.

In some embodiments, the method may also comprise locking one of the sub-graphs, in particular, the vertices and edges, in the knowledge graph. This may prevent the main knowledge graph from being modified in portions relating to the sub-graph if a local copy may have been generated. This feature may make it easier to reintegrate a changed sub-graph, after the sub-graph may have been changed and may need resynchronization or reunification with the original, main knowledge graph. It may be noted that the terms "reinserted," "reintegrated," and "replicated" may be used as synonyms for the activity of bringing the sub-graph into the main knowledge graph.

In some embodiments, generating a local sub-graph may also comprise separating the knowledge graph and the local copy physically from each other. This may include a transfer to a remote device, like a mobile phone or a tablet computer, or another device having limited computing capabilities (e.g., limited memory capacities). Alternatively, it may include a move of the sub-graph to a different partition on the same server (or another server) that manages and controls the main knowledge graph.

In some embodiments, the overlaying the structure and the knowledge graph may comprise determining a percentage of identical vertices of the surrounding structure and the knowledge graph. This may be performed by comparing identifiers of the vertices in questions as well as comparing their content. This may ensure that it may be determined that the content may have been modified even if the vertex—potentially with the same edges structure—still exists.

In some embodiments, the replication may be triggered (potentially automatically) after a predefined number of modifications may have been made to a local sub-graph copy. This may ensure that the replication back into the main knowledge graph may not be too complex because too many changes may have been made to the sub-graph so that a percentage of overlapping vertices may be too small to reintegrate easily the sub-graph again into the main knowledge graph.

In some embodiments, the replication may be triggered if a stable connection between the knowledge graph and the local sub-graph copy may become available. This may imply that a stable network connection may be available between a system hosting the main knowledge graph and another system hosting the sub-graph. It may also imply that enough bandwidth is available for such a connection.

In some embodiments, modifying the content of the local sub-graph may comprise one out of the group comprising modifying content of a vertex of the local sub-graph, adding and/or deleting a vertex of the local sub-graph, modifying (including adding or deleting) edges of the local sub-graph, adapting a weight factor of an edge, and a property value of the vertex. Thus, all typical parameters of the knowledge graph may be changed, adapted and/or modified.

In some embodiments, the replication trigger event may be generated by the knowledge graph upon a predefined condition. One of the reasons to generate the replication trigger by the knowledge graph or a related system may be the fact the surrounding structure of a sub-graph has been modified significantly, e.g., that changes to a percentage of the vertices and edges building the surrounding structure have been made and the percentage has grown over a predetermined threshold value.

In some embodiments, the method may also comprise deleting a local sub-graph if it has not been accessed for a predefined period of time. Thus, resources used by a local sub-graph copy may be released and the resources may be used for other purposes. This may be important for mobile devices having limited storage capacities. Thus, available hardware resources may be used in a more economical way.

In some embodiments, generating the local sub-graph as a copy of one of the sub-graphs of the main knowledge graph may be triggered if a predefined number or a predefined percentage of sub-graph vertices of the one of the sub-graphs has been tagged. The tagging may have been made by user actions or may be machine-generated. In any case, such a situation may imply that changes may have been made to the main, original knowledge graph and it may be useful to make such modifications also available to the (remote) sub-graphs. Thus, a new sub-graph copy may be generated from the original, main knowledge graph and may be transferred to the location of the existing related sub-graph.

In some embodiments, the summary graph vertex relating to the sub-graph may be a component of the surrounding. This way, the vertex of the summary graph representing the sub-graph and the surrounding structure representing vertices of the main knowledge graph may be treated as one common construct depending on each other and relating the sub-graph representing vertex directly to the surrounding structure. Hence, during replication or reintegration of a modified sub-graph, the sub graph vertex of the surrounding structure (i.e., its identifier) may be used as a starting point for the replication procedure. Thus, it may not be necessary to search through the main knowledge graph for a structure coming close enough in terms of overlapping vertices to a modified sub-graph. This may improve the performance of the replication/reintegration significantly.

In the following, a detailed description of the figures will be given. All instructions in the figures are schematic. Firstly, a block diagram of an embodiment of the method for managing a knowledge graph is given. Afterwards, further embodiments, as well as embodiments of the system and computer program product for managing a knowledge graph, will be described.

FIG. 1 shows a flow chart of an example method 100 for managing (in particular updating) a knowledge graph, e.g., the original, main, and/or server-based knowledge graph. The knowledge graph comprises vertices and edges according to known knowledge graph techniques. The method 100 begins at 102 with dividing the knowledge graph into a plurality of sub-graphs—in particular, clusters of vertices, as well as related edges—so that the sub-graphs are a combination of a plurality of vertices and edges.

The method 100 also comprises representing, at 104, the knowledge graph as a summary graph comprising, for each of the sub-graphs, a sub-graph representing vertex (i.e. a vertex which represents the sub-graph). Each of the sub-graph representing vertices is related to an index file and a content file. The index file comprises a list of all sub-graph vertices (and their identifiers) and edges of the sub-graph (and their identifiers and potentially also identifiers of the related vertices). The content file comprises searchable content of the sub-graph, which can be a potentially condensed summary of the content of the vertices of the sub-graphs.

Additionally, the method 100 comprises generating (and the generating may also comprise a separation), at 106, a local sub-graph as a copy of one of the sub-graphs together with a copy of a surrounding structure to the one of the sub-graphs. This can be done for usage by a remote device with limited storage and/or processing capacity. The surrounding structure comprises a (unlinked) group of vertices of the main knowledge graph, where the vertices of the surrounding structure are linked (as defined by the related edges) each to the sub-graph vertices of the one of the sub-graphs via less than a specified small number of edges. For example, the specified number may be three, such that the vertices of the surrounding structure are linked by less than three edges (i.e., one or two edges).

Furthermore, the method 100 comprises modifying, at 108, the content of the local sub-graph—in particular, on a remote device or in a different partition of a server—and replicating, at 110, upon a replication trigger event, the local sub-graph back into the knowledge graph. Thereby, a structure of the surrounding structure is used as a replication aid, by overlaying the surrounding group of vertices and the knowledge graph. This can occur by identifying and/or determining a percentage of identical vertices between the surrounding structure and the main knowledge graph. Thereby, identical vertices of the surrounding structure and the knowledge graph are identified as anchor points from where changes in the local sub-graph are reintegrated into the knowledge graph.

Figure 2:
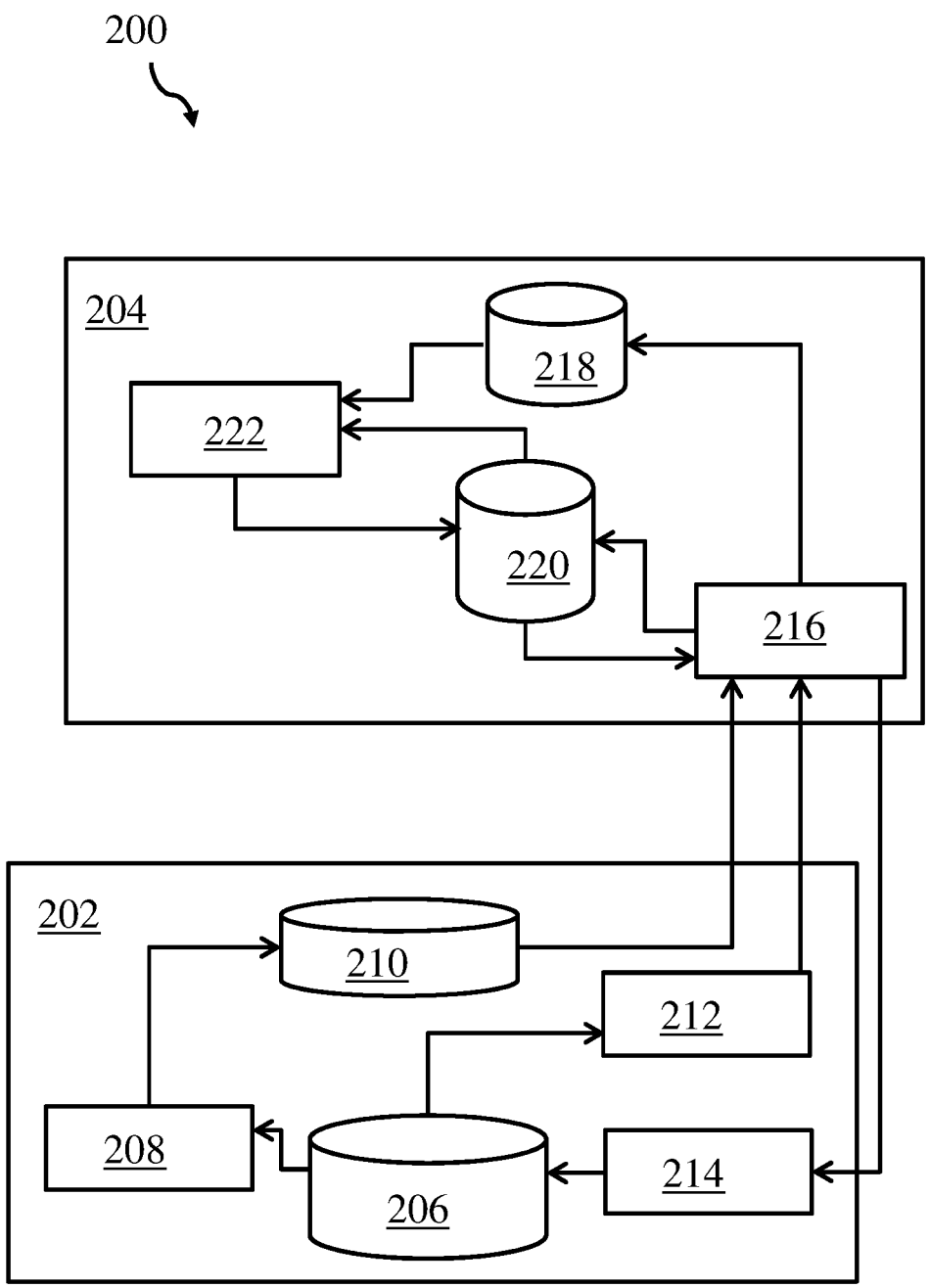
FIG. 2 shows a block diagram of an embodiment of an example component model.

FIG. 2 shows a block diagram of an embodiment of an example component model 200 in accordance with embodiments of the present disclosure. Firstly, it may be mentioned that embodiments of the present disclosure may be applicable, in principle, to all kinds of knowledge graphs, e.g., directed, or undirected, sparse or dense, weighted or unweighted, etc. As a structural method (in contrast to semantic methods), the method is content-agnostic, does not need any training data, and is not dependent on any particular programming language. The functional blocks may be separated into groups: a central knowledge graph management engine 202 and a remote knowledge graph management engine 204. The central knowledge graph management engine 202 contains the central or main knowledge graph 206 which is linked to a clustering and indexing engine 208, from which an index graph 210 can be generated (which can consist of index files and content files). Additionally, the central knowledge graph management engine 202 contains an extraction engine 212 adapted for extracting the sub-graphs from the central knowledge graph 206. Furthermore, the central knowledge graph management engine 202 contains a reinsertion or reintegration or replication and merge engine 214 adapted for bringing back a modified sub-graph into the central knowledge graph 206 through reinsertion/reintegration/replication.

On the other side, the remote knowledge graph management engine 204 contains a replication engine 216 receiving data from the index graph 210 and the extraction engine 212 of the central knowledge graph management engine 202, wherein the replication engine 216 is also adapted for sending data—in particular, a modified sub-graph—to the reinsertion and merge engine 214 of the central knowledge graph management engine 202.

Additionally, the remote knowledge graph management engine 204 contains a copy of the index graph 218 and a storage 220 for the extracted sub-graphs of a superset of sub-graphs. As shown, the storage of the index graph 218 and the sub-graph 220 are both connected to a user interface 222 which may also comprise a search engine for interacting with the locally stored sub-graph 220.

Figure 3:
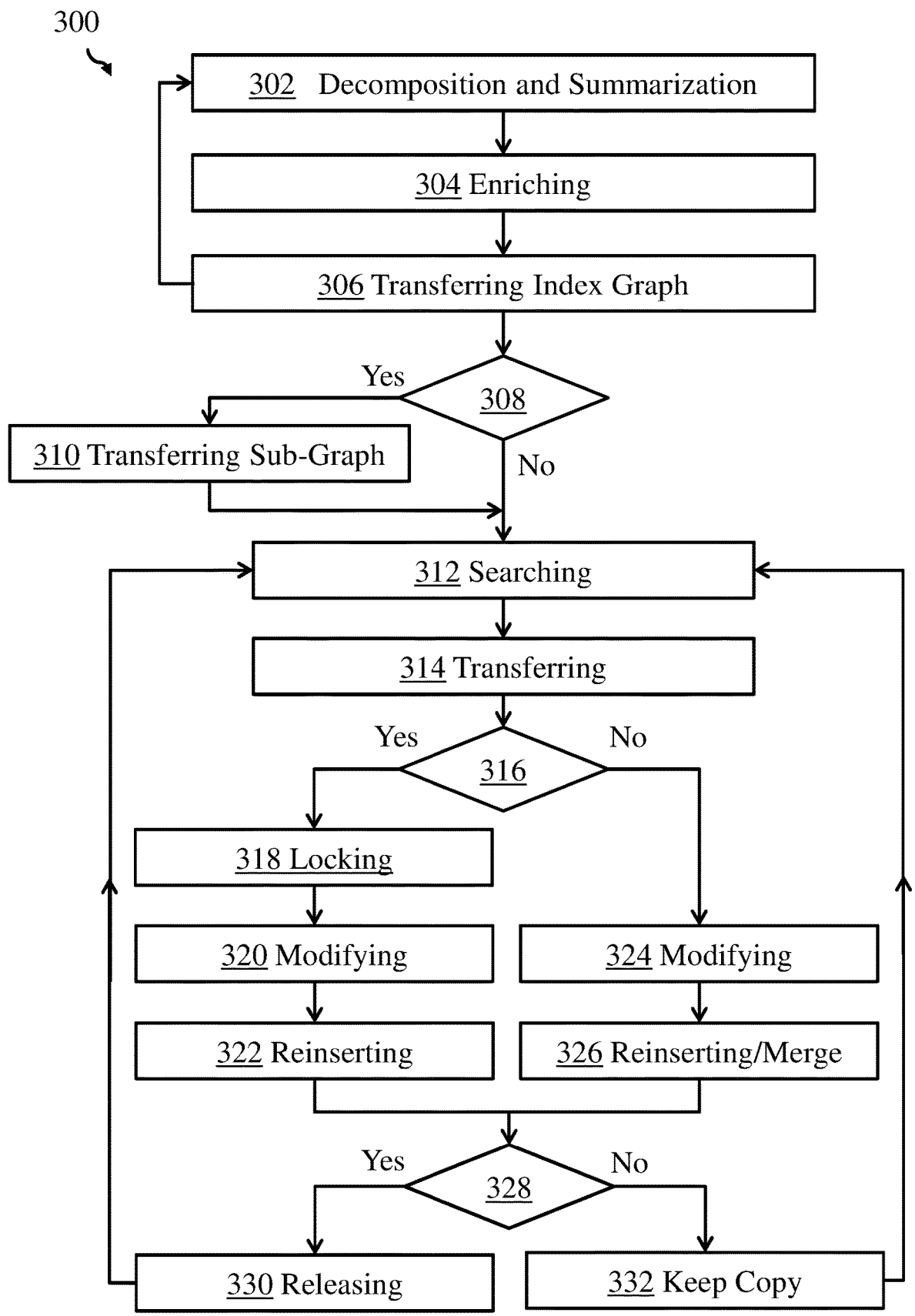
FIG. 3 shows a flow chart of an embodiment of an example method.

FIG. 3 shows a detailed flow chart of an embodiment of one example of a method 300. The process flow starts with a decomposition and summarization of the central knowledge graph, at 302. A central knowledge graph can be represented by $G(V, E)$ and comprise the set V of all vertices and of the set E of all edges. The central knowledge graph can be broken down into a set of sub-graphs $g_i(v_i, e_i)$, each comprising a subset of vertices $v_i$ out of V and a subset of edges $e_i$ out of E. Each sub-graph can be much smaller than the central knowledge graph, i.e., comprising much fewer vertices and edges than the central knowledge graph, represented by $g_i(v_i, e_i) \subset G(V,E)$. Sub-graphs can be disjointed or may overlap.

The community structure of knowledge graphs has been studied in detail and various techniques have been described to identify sub-graphs in the knowledge graph; often in the context of graph summarization. Details, comparisons, relative advantages and efforts for the related techniques are known to a person skilled in the art. For the purposes of this disclosure, any of these techniques can be selected and used in accordance with the teachings presented herein. The techniques can reduce the size of the original graph by a factor of $10^2$ to $10^3$ and can produce a summary graph. In case where an even higher ratio of summarization is desired, such techniques can be applied recursively.

This first operation 302 of the method 300 marks the decomposition and summarization of the central knowledge graph $G(V,E)$, using one of the above-mentioned techniques. The central knowledge graph is preserved during this operation. The summary (knowledge) graph is stored separately. Each vertex of the summary graph corresponds to one sub-graph.

It may be noted that the sub-graphs may overlap. The size of the overlap (relative to the size of the sub-graphs) of two sub-graphs can be used to increase the weight of the edge connecting the two vertices representing the sub-graphs in the summary graph.

At 304, the index graph is created by enriching this summary knowledge with content and/or an index of vertices and edges. The summary knowledge graph can be enriched with searchable content for each vertex. The content can be retrieved from the vertices of, e.g., the sub-graph with the highest centrality. In some embodiments, the content from a predetermined number of high centrality vertices is simply concatenated. In some embodiments, the content could be merged or summarized using semantic techniques or be subject to intent mapping. However, this approach would dilute the structural approach of the method as such, and universality in terms of content and language. The summary knowledge graph can also or alternatively be enriched with an index containing all the vertices $v_i$ and edges $e_i$ of the sub-graph $g_i(v_i, e_i)$, which can be added to each vertex of the summary graph. The enriched summary (knowledge) graph may be denoted as the index graph.

Additionally, the index graph is transferred, at 306, to the remote device (or another partition on the server). The index knowledge graph is transferred (replicated) to the device at issue, e.g., the remote device, or the other server system partition. Because the central domain knowledge graph can be subject to change, operations 302 through 306 can be repeated regularly, whereby the central knowledge graph is decomposed, summarized, enriched, and transferred as appropriate, as indicated by the looping arrow from 306 back to 302.

Next, at 308, it is determined whether to populate the local copy of the sub-graph. In some embodiments, operation 308 can be optional. At 308 it can be decided whether a certain set of sub-graphs is transferred to the remote device without being specifically requested (as will be described below regarding operation 314). In one implementation, the set of sub-graphs to be transferred without specific request could consist of most popular ones (e.g., sub-graphs with the most frequent read accesses), or the most recently added ones (e.g., sub-graphs with the most frequent right access/changes). In other implementations, a user profile can exist and be enriched with fields of interest (e.g., using tags). When the user tags a vertex, the tag can also be added to the user profile or the tag counter can be increased. At 308, the sub-graphs containing a number of vertices with tags above some threshold value with content matching can be transferred.

In yet another implementation, one could synchronize local sub-graphs between devices (either directly or via the central server). For this purpose, it could be useful to cluster the local devices based on the past history of sub-graph downloads, i.e., devices with similar histories would fall into the same cluster. In such embodiments, sub-graph downloads could be tracked, and it could then be calculated how similar the download histories are. For instance, one could compute which fraction of sub-graphs downloaded by device A was also downloaded by device B and vice versa. If the sub-graphs are not identical in many cases, one could furthermore compare the similarity of the sub-graphs (e.g., using a metric, such as the ones presented below, where local copies are compared with the central copy of sub-graph). For the devices in the same cluster, one could pass a sub-graph downloads/update which was only downloaded to one device also to the other devices (which may have an outdated version of the sub-graph or perhaps had not yet downloaded this sub graph at all). If the decision at 308 is "yes", the transfer of one or more sub-graphs to the remote device is triggered, which is performed at 310. If the decision at 308 is no, or after one or more sub-graphs are transferred, the method proceeds to operation 312.

At 312, a search may be performed on the local copy of the summary graph. This can be performed by a search engine running on the mobile device. After this, at 314, a transfer of one or more sub-graphs to the remote device can be triggered. This trigger can occur upon request (i.e., selection of a search result, which is a hit of a vertex of the index graph). The system can copy the corresponding sub-graph to the device. Unless it was the first sub-graph transferred to the device, the sub-graph is inserted into the existing set of sub-graphs, i.e., the partial copy of the central graph (constructed by the previously transferred sub-graphs) is augmented by the most recently transferred sub-graph. In cases where a sub-graph was transferred at 310, operation 314 may be optional.

At 316, a determination is made whether to lock at least a portion (e.g., the portion comprising the equivalent of the sub-graph) in the central knowledge graph. In case of "yes," the portion of the central knowledge graph comprising the equivalent of the copied knowledge graph is locked to prevent changes at 318. The lock is added as an attribute to the corresponding vertex/vertices of the summary graph. The process of transferring the sub-graph and locking the central copy of the sub-graph can be called check-out.

After locking at 318, a modification of the local (remote) sub-graph is performed at 320. The local sub-graph can be accessed like the online central knowledge graph, i.e., be searched and read. Content of the vertices and structure of the edges (linkage) can be modified. One or more such changes or modifications can occur at 320.

After modifications at 320, a reinsertion, replication, or resynchronization of the local subgraphs (from the remote device) into the central knowledge graph is performed at 322. The local sub-graph is transferred and reinserted in the central knowledge graph. In some embodiments, the reinsertion is triggered, as soon as the level of network connectivity allows a transfer. In some embodiments, the reinsertion can be triggered by passage of a certain time period or when a volume of number of modifications equals or exceeds a predetermined threshold value. In some embodiments, the local user can initiate the transfer. In some embodiments, the central system can recall the sub-graph upon a certain event, e.g., the sub-graph previously transferred to a remote device A is requested to be transferred to a device B, a lock on a sub-graph is to be removed, direct (online) modifications to the central knowledge graph are requested, etc.

The reinsertion occurs based on an algorithm. In some embodiments, this involves calculating the overlapping percentage of vertices. The overlapping percentage could be defined as the fraction of overlapping vertices as a function of the total number of vertices and the local or central subgraphs or equivalently for the edges or info validity for both, vertices and edges. The replication then depends on the overlap percentage and could range from no replication to a complete replication. In between the extremes, selected vertices and edges that only exist in the local sub-graph copy are introduced to the central knowledge graph or, equivalently, vertices and edges missing in the local copy are removed from the central knowledge graph. For example, they may have to be below a certain threshold distance to one or more of the identified anchor points. Further detail regarding reinsertion is provided below in reference to FIGS. 4-6.

In case of "no," at determination 316, the portion of the central knowledge graph comprising the equivalent of the copied knowledge graph is not locked. In such cases, the modification may be performed to the local (i.e., remote) sub-graph at 324, similarly to operation 320. Additionally, because the central version of the sub-graph is not locked, changes may be performed synchronously, also at 324. After modifications at 324, a merge of the local sub-graph into the central knowledge graph can be performed at 326, similarly to operation 322.

After operation 322 or 326, the method proceeds to determination 328, where it can be determined whether to release the space for the local sub-graph copy. In case of "yes", one or more of the local sub-graphs may be deleted, at 330, from the device (or the related partition on the server). Optionally, local sub-graphs not accessed for a predetermined period of time may be deleted from the device(s) to release storage space. In some embodiments, an expiration of the sub-graph can be triggered when the available device storage falls below a certain threshold value.

In some embodiments, deletion of local sub-graphs can be triggered once the corresponding parts of the central knowledge graph have been significantly modified, i.e., the local copies have become sufficiently outdated. In such embodiments, a mechanism to compare the local sub-graphs with the central knowledge graph can be used and a metric can exist for measuring how outdated the local copies are. For instance, one could include the following factors in such a metric: fraction of central vertices which are also present in the local copy, fraction of local vertices which are also present in the central copy, fraction of central edges, which are also present in the local copy, fraction of local images which are also present in the central copy, fraction of central attributes which are also present in the local copy, fraction of local attributes which are also present in the central copy, and total number of modifications of the central copy.

In case of "no," at 328, the local sub-graph is kept on the device, at 332. If the user has finished using the knowledge graph on the remote device of partition, the method can end. If not, the method can return to operation 312 and another search can be performed on the local copy of the summary graph.

Figure 4:
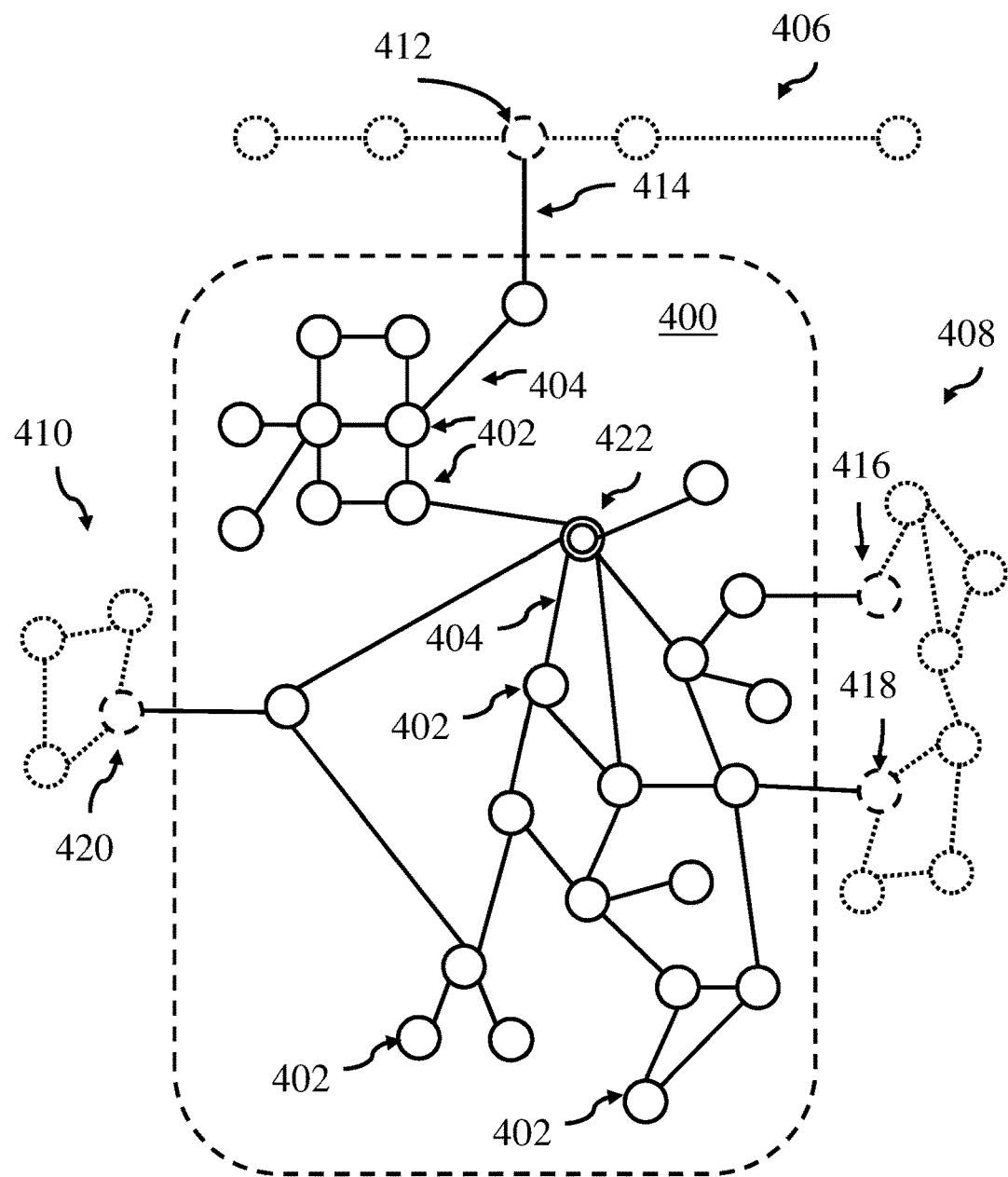
FIG. 4 shows a block diagram of an embodiment of an example sub-graph with a surrounding structure.

FIG. 4 shows a block diagram of an embodiment of an example sub-graph 400 with a surrounding structure. The sub-graph comprises vertices 402 (sometimes also denoted as nodes) and edges 404, identified by a cluster algorithm, as well as edges directly connecting the vertices 402 with vertices outside the cluster. It should be noted that only a small number of vertices of the subgraphs 400 are shown with reference numerals 402 for comprehensibility reasons. The same applies to the edges 404.

Additionally, the groups of vertices 406, 408, and 410 (as well as related edges) outside the sub-graph 400, which are vertices of the central knowledge graph, are only shown with a single reference numeral. For example, the group 406 of vertices of the central knowledge graph is linked via one edge, namely, the edge 414 to the sub-graph 400. It may be clear for a person skilled in the art that the groups of vertices, 406, 408, and 410 can be linked to further vertices of the central knowledge graph (not shown). The vertices and edges which do not belong to the sub-graph 400 are shown in dotted lines, except the vertices, which do not belong to the sub-graph 400 but are directly connected by edges to vertices within the sub-graph, are shown in bold dotted lines. In total, the sub-graph 400 is linked via 4 edges to the surrounding structure of the sub-graph 400. The surrounding of the sub-graph 400 may be seen as the sum of all those vertices 412, 416, 418, and 420 or the groups of vertices 406, 408, and 410. These vertices 412, 416, 418, and 420, have less than three edges (in particular one or two) links/edges from the main knowledge graph into the sub-graph 400. These vertices 412, 416, 418, and 420 indicate or determine how the sub-graph 400 is embedded in the central knowledge graph. Thus, they represent the surrounding structure.

Additionally, it may be noted that the vertex 422 has a high centrality degree (in fact, equal to 6) relative to the other vertices in the sub-graph 400 (having a centrality between 1 and 5). In this example, the content of this vertex 422 could be used as the content of the vertex in the summary graph representing this sub-graph.

Figure 5:
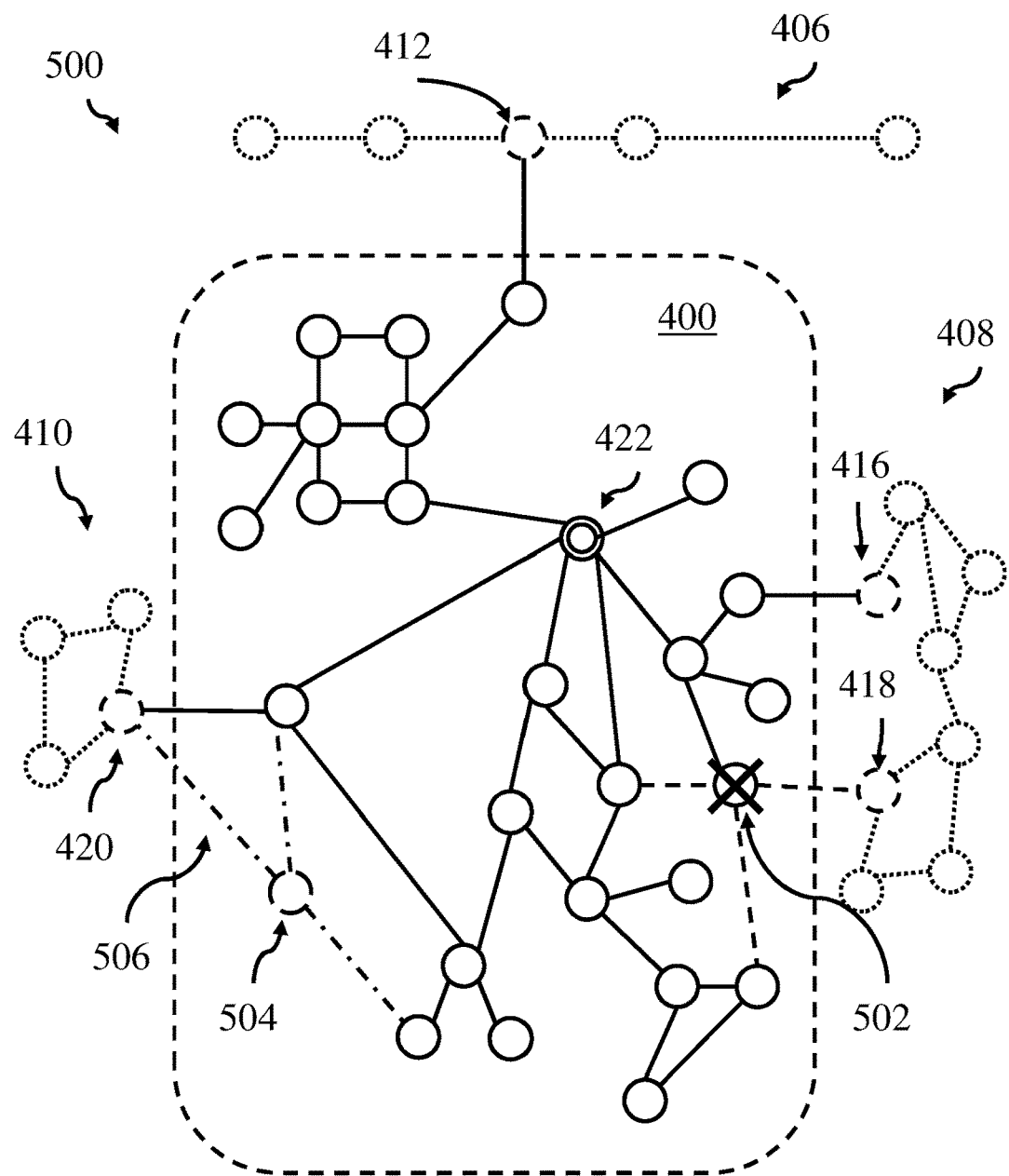
FIG. 5 shows a block diagram of an embodiment of a modification of the example sub-graph of FIG. 4 with the surrounding structure.

FIG. 5 shows a block diagram 500 of an embodiment of a modification of the example sub-graph 400 with a surrounding comprising the groups of vertices 406, 408, and 410. This may relate back to the step 320 and/or 322 of FIG. 3.

Generally, the content of the vertices and the structure (including edges) of the sub-graph 400 can be changed. Local vertex content changes will be applied to the central knowledge graph when the sub-graph 400 is reinserted or reintegrated or replicated. This can be handled in the following way: the edge $e_{jk}$ is defined as a connection between two vertices $v_j$ and $v_k$. In the special case, a so-called loop $e_{jj}$, an edge connects only to one vertex $v_j$. In some embodiments, loops can be handled like edges between two vertices.

Firstly: A removal of vertex $v_j$ of the sub-graph leads to a removal of all edges $e_{jk}$ independently whether $v_k$ is part of the sub-graph of a vertex to which the sub-graph is connected. In the special case that all vertices having edges connecting the sub-graph to the remaining knowledge graph (e.g., the four vertices on the border of the sub-graph in FIG. 5), the sub-graph is later reinserted in the central knowledge graph as a disconnected graph.

Secondly: Addition of a new vertex $v_m$ to the sub-graph could include one or more edges $e_{mk}$ to another vertex $v_k$ of the sub-graph and/or edges to neighbors.

Thirdly: Similarly, edges of existing vertices of the sub-graph (also to neighbors) can be added and removed. Also, attributes (e.g., weight factor values) of edges can be changed.

For example, in FIG. 5, on the right-hand side, the vertex 502 was removed (indicated by the X over the vertex) and subsequently the three edges (dashed lines connecting to vertex 502) connecting to the vertex are also removed. Additionally, and shown in dashed-dotted lines, on the left-hand side of FIG. 5, a new vertex 504 is added and linked via three edges 506 (dashed-dotted lines) to two vertices within the sub-graph 400 and via the edges 506 to the vertex group 410, and in particular to vertex 420.

In case the most central vertex 422 is removed, or due to changes of edges another vertex became the most central one, the index graph is not immediately affected. Only after the sub-graph is reinserted into the central knowledge graph, the changes affect the outcome of the first step of the example method discussed above, namely, the determination of the plurality of sub-graphs.

A reinserting of a sub-graph into the central knowledge graph can be performed in the following way: the reinsertion happens by connecting the (potentially modified) edges of the neighbors of the surrounding structure to the sub-graphs.

In case, a lock was imposed on the central knowledge graph for the scope of the sub-graph (and correspondingly a lock on the copies transferred to the other devices later), the sub-graph can be simply inserted. Otherwise, in case contradicting changes have occurred on various copies of the sub-graph, the system provides predefined parameters how to handle contradicting changes. Examples of such parameters include (but are not limited to) the following:

local changes prevail;

central changes prevail;

more extensive changes prevail, i.e., depending on the number of changes, either option a) or b) is selected by the system automatically;

merge differing sets of changes using a set of predetermined parameters to define the order and preference, including options of:

(1) process local editions, then process central additions;

(2) process local removals, then process central removals;

(3) process local link changes, then process central link changes;

(4) process local content changes, then process central content changes;

(5) process changes based on algorithmically derived parameters, such as the overlap percentage and threshold distance mentioned above. In some embodiments, the system is configured such that local editions and removals are also carried out in the central knowledge graph, as long as the overlapping percentage is below a certain, predefined value. In effect, this would mean that when major changes are carried out in the local copy of the sub-graph, which fundamentally may change the structure of the local copy, no changes are introduced in the central knowledge graph. When the total number of changes is relatively small, as indicated in FIG. 5, however, all changes are replicated. In some embodiments, local changes which are to be replicated have to be below a certain threshold distance to one of the anchor points. This would lead, for instance, to vertices and edges that were introduced far away from all anchor points in the local copy of the sub-graph not to be inserted into the central knowledge graph.

In embodiments merging differing sets of changes using a set of predetermined parameters, it is possible that a first implemented change will prevent implementation of another change and in such case, the second change can be dropped. For example, if a vertex was removed in the local copy of the sub-graph, but in the central knowledge graph a change occurred to the edges connected to this vertex, removal of the vertex would mean that the changes to its connections would not be implemented.

Figure 6:
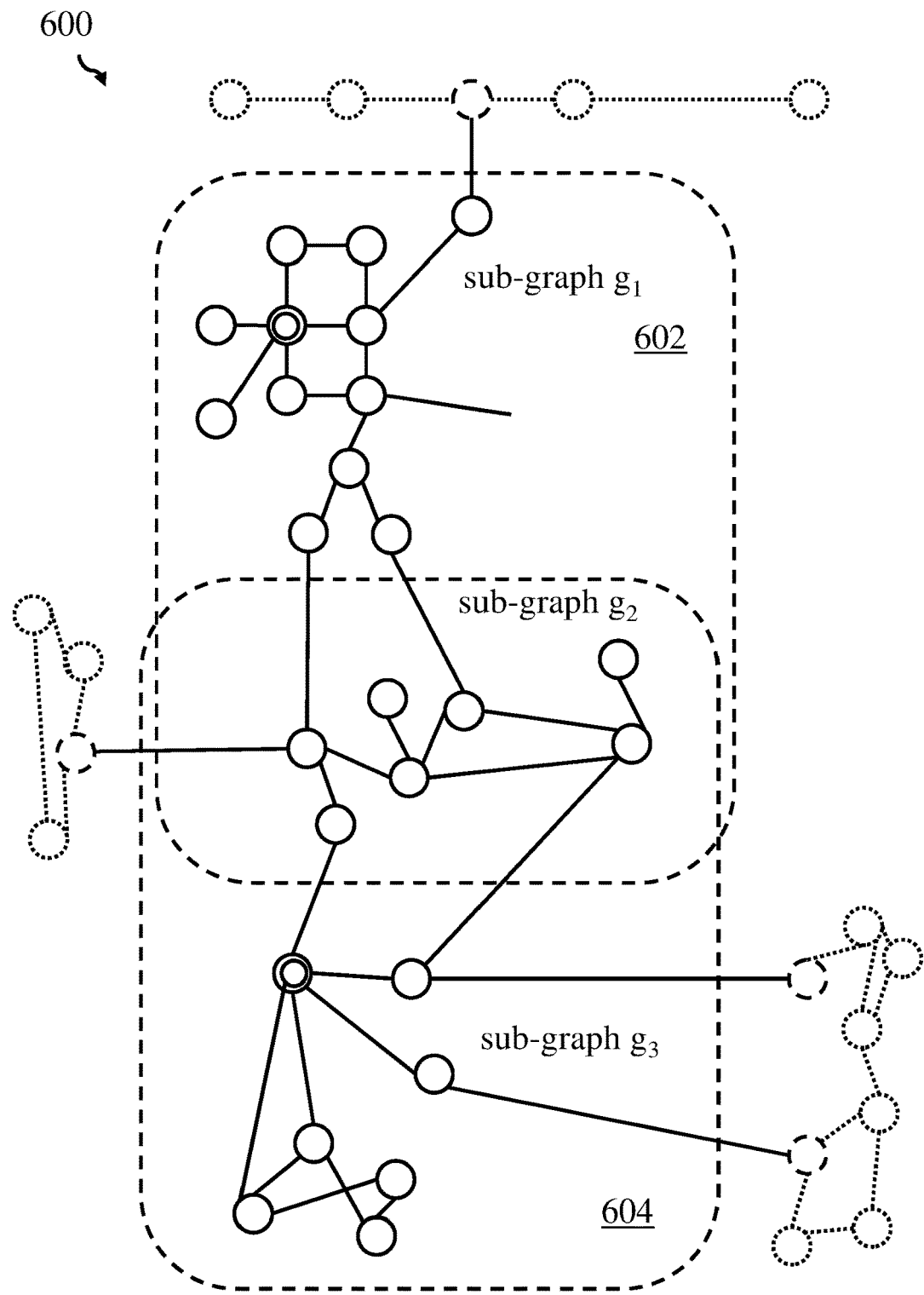
FIG. 6 shows a block diagram of an embodiment of example overlapping clusters of vertices.

FIG. 6 shows a block diagram 600 of an embodiment of example overlapping clusters of vertices. Some of the methods for graph clustering (i.e., determining sub-graphs) allow overlapping clusters. Some methods avoid overlapping clusters for the sake of unambiguous dissection. Some methods used the level of overlap to define the weight of the edges between the clusters (i.e., weight of the edges of the next graph in this context). Embodiments of the preset disclosure can use both, methods with and without, overlapping clusters/sub-graphs.

In the example of FIG. 6, the clustering method has defined two overlapping clusters, 602, 604. Accordingly, embodiments of the method discussed above define two vertices in the index graph connected by an edge (for example with weight 7, the number of vertices in the overlap). Two sub-graphs $g_A = \{g_1, g_2\}$ and $g_B = \{g_2, g_3\}$ are defined. There exists now the possibility that $g_A$ is modified on one device and $g_B$ is modified on another device.

In situations where sub-graphs are not locked upon extraction, the merge process of method step 322 or 326, FIG. 3 is applied to each sub-graph upon reinsertion into the central knowledge graph, e.g., first that $g_A$ is merged and then $g_B$. Thus, changes to the overlap are merged subsequently into the central knowledge graph.

In situations where locks are imposed during the check-out process of a sub-graph, the following possible implementations may exist:
(a) The overlap $g_2$ is locked universally if only one sub-graphs with overlap (say $g_A$) is transferred to a device. (If both $g_A$ and $g_B$ are transferred, a lock on the central copies $g_A$ and $g_B$ can be applied and the client can modify both, $g_A$ and $g_B$, including the overlap).
(b) The overlap $g_2$ is locked on the central knowledge graph if only one sub-graph (say $g_A$) is transferred to the device. If $g_B$ is transferred to another device subsequently, $g_2$ is locked and only $g_3$ can be modified locally.

Figure 7:
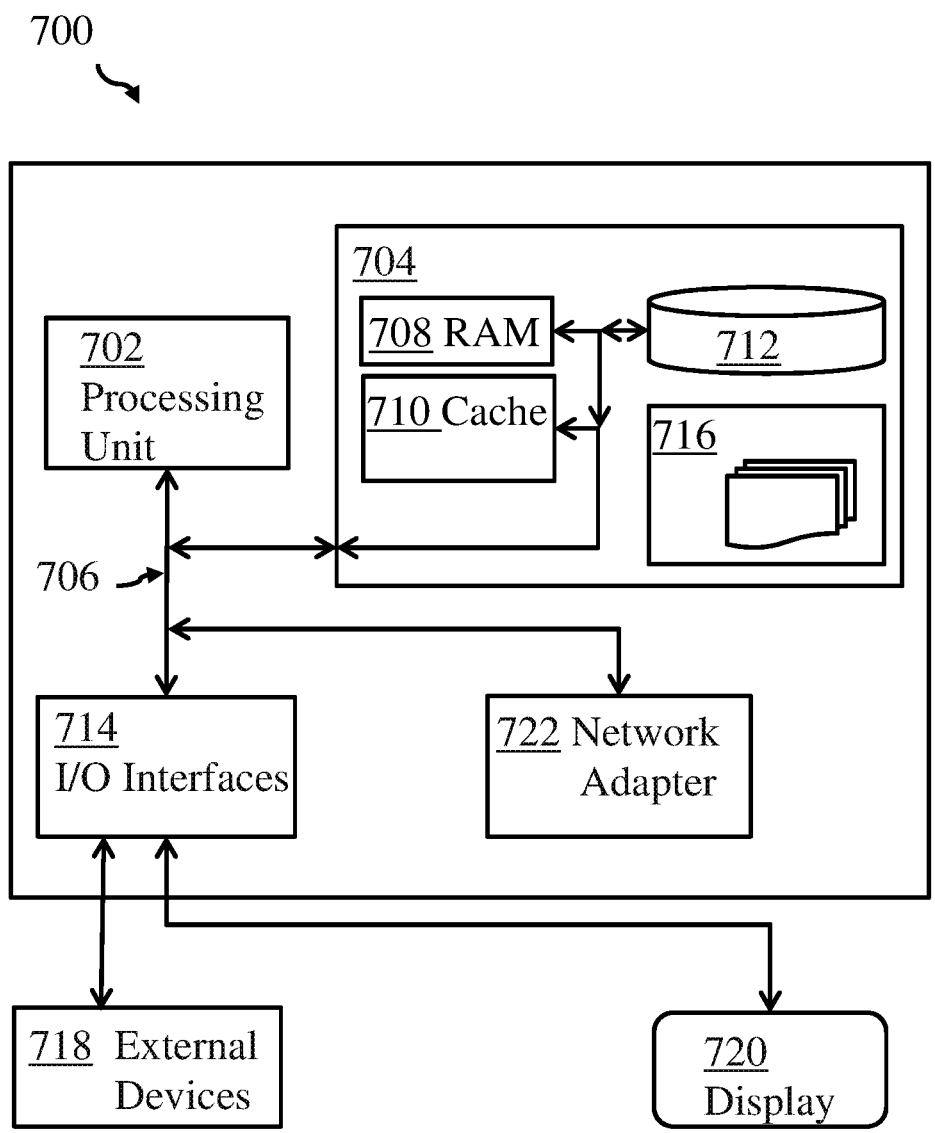
FIG. 7 shows an embodiment of a block diagram of an example computing system comprising a system for managing a knowledge graph.

Embodiments of the present disclosure may be implemented together with virtually any type of computer, regardless of the platform being suitable for storing and/or executing program code. FIG. 7 shows, as an example, a computing system 700 suitable for executing program code related to embodiments of the present disclosure.

The computing system 700 is only one example of a suitable computer system and is not intended to suggest any limitation as to the scope of use or functionality of embodiments of the present disclosure. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system 700 is shown in the form of a general-purpose computing device. The components of computer system 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 700 typically includes a variety of computer system readable media. Such media may be any available media that is accessible by computer system 700, and it includes both, volatile and non-volatile media, removable and non-removable media.

The system memory 704 may include computer system readable media in the form of volatile memory, such as random access memory (RAM) 708 and/or cache memory 710. Computer system 700 may further include other removable/non-removable, volatile/non-volatile computer system storage media. By way of example only, a storage system 712 may be provided for reading from and writing to a non-removable, non-volatile magnetic media (not shown and typically called a "hard drive"). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the present disclosure.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the present disclosure.

The computer system 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for managing a knowledge graph, the knowledge graph comprising vertices and edges, the method comprising:
   dividing the knowledge graph into a plurality of sub-graphs, each sub-graph comprising a plurality of vertices and a plurality of edges;
   representing the knowledge graph as a summary graph comprising for each of the sub-graphs a summary-graph vertex, wherein each summary graph vertex is related to a respective index file and a respective content file, wherein the respective index file comprises a list of the vertices of the sub-graph and edges of the sub-graph, and wherein the respective content file comprises searchable content of the sub-graph;
   generating a local sub-graph as a copy of one of the sub-graphs together with a copy of a surrounding graph to the one of the sub-graphs, wherein the surrounding graph comprises a group of vertices of the knowledge graph that are each linked to the plurality of vertices of the one of the sub-graphs via less than a threshold number of edges;
   modifying the content of the local sub-graph; and
   reintegrating, upon a reintegration trigger event, the local sub-graph back into the knowledge graph, wherein a structure of the surrounding graph is used as a reintegration aid, by overlaying the structure and the knowledge graph, thereby identifying identical vertices of the surrounding structure and the knowledge graph as anchor points from where changes in the local sub-graph are reintegrated into the knowledge graph.

2. The method according to claim 1, further comprising: locking the one of the sub-graphs in the knowledge graph.

3. The method according to claim 1, wherein generating the local sub-graph further comprises separating the knowledge graph and the local sub-graph physically from each other.

4. The method according to claim 1, wherein the overlaying the structure and the knowledge graph comprises:
   determining a percentage of identical vertices of the structure of the surrounding graph and the knowledge graph.

5. The method according to claim 1, wherein the reintegration is triggered after a predefined number of modifications has been made to the local sub-graph.

6. The method according to claim 1, wherein modifying the content of the local sub-graph comprises one out of the group comprising modifying content of a vertex of the local sub-graph, adding a vertex of the local sub-graph, deleting a vertex of the local sub-graph, modifying edges of the local sub-graph, modifying a weight factor of an edge, and modifying a property value of a vertex.

7. The method according to claim 1, wherein the reintegration trigger event is generated by the knowledge graph upon a predefined condition.

8. The method according to claim 1, further comprising:
   deleting a local sub-graph if it has not been accessed for a predefined period of time.

9. The method according to claim 1, wherein generating the local sub-graph as a copy of one of the sub-graphs is triggered if a predefined number or a predefined percentage of sub-graph vertices of the one of the sub-graphs has been tagged.

10. A system for managing a knowledge graph, the knowledge graph comprising vertices and edges, the system comprising:
    one or more processors; and
    a memory communicatively coupled to the one or more processors, wherein the memory comprises instructions which, when executed by the one or more processors, cause the one or more processors to perform a method comprising:

dividing the knowledge graph into a plurality of sub-graphs, each sub-graph comprising a plurality of vertices and a plurality of edges;

representing the knowledge graph as a summary graph comprising for each of the sub-graphs a summary-graph vertex, wherein each summary graph vertex is related to a respective index file and a respective content file, wherein the respective index file comprises a list of the vertices of the sub-graph and edges of the sub-graph, and wherein the respective content file comprises searchable content of the sub-graph;

generating a local sub-graph as a copy of one of the sub-graphs together with a copy of a surrounding graph to the one of the sub-graphs, wherein the surrounding graph comprises a group of vertices of the knowledge graph that are each linked to the plurality of vertices of the one of the sub-graphs via less than a threshold number of edges;

modifying the content of the local sub-graph; and reintegrating, upon a reintegration trigger event, the local sub-graph back into the knowledge graph, wherein a structure of the surrounding graph is used as a reintegration aid, by overlaying the structure and the knowledge graph, thereby identifying identical vertices of the surrounding structure and the knowledge graph as anchor points from where changes in the local sub-graph are reintegrated into the knowledge graph.

11. The system according to claim 10, wherein generating the local sub-graph further comprises separating the knowledge graph and the local sub-graph physically from each other.

12. The system according to claim 10, wherein the overlaying the structure and the knowledge graph comprises:
determining a percentage of identical vertices of the structure of the surrounding graph and the knowledge graph.

13. The system according to claim 10, wherein the reintegration is triggered after a predefined number of modifications has been made to the local sub-graph.

14. A computer program product for managing a knowledge graph, the knowledge graph comprising vertices and edges, the computer program product comprising a computer readable storage medium having program instructions embodied therewith, wherein the computer readable storage medium is not a transitory signal per se, the program instructions executable by a computer to perform a method comprising:

dividing the knowledge graph into a plurality of sub-graphs, each sub-graph comprising a plurality of vertices and a plurality of edges;

representing the knowledge graph as a summary graph comprising for each of the sub-graphs a summary-graph vertex, wherein each summary graph vertex is related to a respective index file and a respective content file, wherein the respective index file comprises a list of the vertices of the sub-graph and edges of the sub-graph, and wherein the respective content file comprises searchable content of the sub-graph;

generating a local sub-graph as a copy of one of the sub-graphs together with a copy of a surrounding graph to the one of the sub-graphs, wherein the surrounding graph comprises a group of vertices of the knowledge graph that are each linked to the plurality of vertices of the one of the sub-graphs via less than a threshold number of edges;

modifying the content of the local sub-graph; and reintegrating, upon a reintegration trigger event, the local sub-graph back into the knowledge graph, wherein a structure of the surrounding graph is used as a reintegration aid, by overlaying the structure and the knowledge graph, thereby identifying identical vertices of the surrounding structure and the knowledge graph as anchor points from where changes in the local sub-graph are reintegrated into the knowledge graph.

15. The computer program product according to claim 14, wherein generating the local sub-graph further comprises separating the knowledge graph and the local sub-graph physically from each other.

16. The computer program product according to claim 14, wherein the overlaying the structure and the knowledge graph comprises:
determining a percentage of identical vertices of the structure of the surrounding graph and the knowledge graph.

17. The computer program product according to claim 14, wherein the reintegration is triggered after a predefined number of modifications has been made to the local sub-graph.

* * * * *